United States Patent [19]
Piosenka et al.

[11] Patent Number: 5,926,756
[45] Date of Patent: Jul. 20, 1999

[54] METHOD AND SYSTEM FOR PROGRAMMING A CELLULAR PHONE

[75] Inventors: Gerald Vincent Piosenka, Scottsdale; Marc Alan Newman, Mesa; William Chunhung Yip, Scottsdale; James Brian Piket, Gilbert, all of Ariz.

[73] Assignee: Motorola, Inc., Schaumburg, Ill.

[21] Appl. No.: 08/703,270

[22] Filed: Aug. 26, 1996

[51] Int. Cl.$^6$ .................................................... H04Q 7/30
[52] U.S. Cl. ........................ 455/418; 455/419; 455/556
[58] Field of Search ..................... 455/418, 419, 455/550, 566, 555, 556; 395/701, 702, 703; 345/352, 967; 379/915, 916, 93.7, 93.19, 354

[56] References Cited

U.S. PATENT DOCUMENTS

| | | | |
|---|---|---|---|
| 5,029,233 | 7/1991 | Metroka | 455/11 |
| 5,086,513 | 2/1992 | Lawrence et al. | 455/186 |
| 5,109,403 | 4/1992 | Sutphin | 379/59 |
| 5,127,040 | 6/1992 | D'Avello et al. | 455/419 |
| 5,276,729 | 1/1994 | Higuchi et al. | 279/355 |
| 5,297,192 | 3/1994 | Gerszberg | 455/419 |
| 5,422,656 | 6/1995 | Allard et al. | 455/556 |
| 5,465,288 | 11/1995 | Falvey et al. | 379/58 |
| 5,487,108 | 1/1996 | Atkins et al. | 455/419 |
| 5,491,740 | 2/1996 | Ellis et al. | 379/58 |
| 5,507,009 | 4/1996 | Grube et al. | 455/419 |
| 5,568,536 | 10/1996 | Tiller et al. | 455/557 |
| 5,625,669 | 4/1997 | McGregor et al. | 455/418 |
| 5,629,978 | 5/1997 | Blumhardt et al. | 455/4.1 |
| 5,657,378 | 8/1997 | Haddock et al. | 379/93.23 |
| 5,760,768 | 6/1998 | Gram | 345/352 |
| 5,761,280 | 6/1998 | Noonen et al. | 379/93.05 |
| 5,764,639 | 6/1998 | Staples et al. | 379/211 |

*Primary Examiner*—Dwayne D. Bost
*Assistant Examiner*—Jean A. Gelin
*Attorney, Agent, or Firm*—Frank J. Bogacz; John C. Scott

[57] ABSTRACT

A method and system simplifies and accomplishes the programming of a PED (12), such as a cellular telephone (22), via the use of a personal computer (PC). The present invention includes software (52, 54) within the PC (14) for providing a graphical user interface (GUI) to the user for ease and simplicity of selecting various programming features and settings associated with the cellular telephone to be programmed. The software further includes a translator (56) for translating these user selected features/settings into specific key depresses to be sent to the cellular telephone, via software and hardware interfaces (58, 18, 20), for accomplishing the programming of such features/settings. Additionally, the software includes the capability to monitor the data being displayed on the cellular telephone because such data may be required to accomplish various programming features.

8 Claims, 5 Drawing Sheets

METHOD AND SYSTEM FOR PROGRAMMING A CELLULAR PHONE

BACKGROUND OF THE INVENTION

This invention relates to programming electronic devices and, in particular, a method and apparatus for rapidly and easily programming a cellular telephone.

Advances in technology have resulted in cellular telephones with an ever increasing range of programmable features. Such programmable features include, for example, programmable personal directories, timers, tone controls, volume controls, security features, system operation, multiple selectable service providers and phone numbers, etc. Additionally, competing cellular telephone products are often successfully promoted on the basis of their ease of programming, even though versatility, usability, functionality and other important attributes of a properly programmed cellular telephone are sacrificed to ease of the programming process. Although much consideration has been given to the ease of programming cellular telephones, the fact remains that a majority of cellular telephone users only utilize a fraction of the available programmable features. Those who do attempt to take advantage of these features are often discouraged by the lengthy instruction manuals and the cumbersome nature of entering data on the diminutive keypad found on most cellular telephones. As a result, most programming features are never used nor enjoyed, and consumer frustration over programming cellular telephones results which leads to diminished brand loyalty, reduced satisfaction of the product and even a negative opinion of electronic technology in general.

Additionally, a similar problem exists for cellular telephone sales personnel and service providers. For activation, the cellular telephones require a NAM programming sequence which consists of a lengthy, burdensome and error prone sequence of key depresses. Further, the pressure to persuade consumers to purchase one product over another can be influenced by the seller due to the relative difficulty the seller has in setting up a newly purchased telephone. As a result, a technique for easily performing the NAM programming sequence of a cellular telephone could result in increased sales for that cellular telephone.

Accordingly, a need clearly exists for improving the process of programming electronic devices such as cellular telephones. Referring to U.S. Pat. No. 5,086,513 (the '513 patent), a digital radio communications transceiver programming apparatus and method is disclosed which is used to load personality defining information in a non-volatile EEPROM memory within a portable or mobile digital radio transceiver. The '513 patent, however, is written specifically for conventional handheld portable radios and does not attempt to address any issues involved with other communication devices such as cellular telephones. Moreover, the '513 patent describes in detail the programming features associated with handheld radios and, in fact, a majority of the text is dedicated to a thorough and tedious description of the format and navigation procedures as well as defining a primitive DOS window interface specification for the software. However, the '513 patent does not teach or discuss any aspects associated with programming a cellular telephone nor does it provide any disclosure associated with programming various features of a cellular telephone such as timers, tone controls, security features, system operation and NAM programming sequence.

Thus, a need exists for improving the process of programming cellular telephones. Accordingly, the present invention describes a method and apparatus for programming cellular telephones with a personal computer or other computing device for greatly simplifying the process of programming the cellular telephone. As a result, the amount of time required to program a cellular telephone is greatly reduced, while the number of errors encountered during the programming process is minimized.

DETAILED DESCRIPTION OF THE DRAWINGS

The present invention provides a method and apparatus that simplifies the programming of programmable electronic devices (PEDs), such as cellular telephones, pagers, VCRs, etc. The present invention abates the need for the user of a PED to manually go through a sequence or series of steps in order to program the PED to perform or access one of its inherent functions or capabilities. To that end, the present invention allows users of such PEDs to utilize superior human machine interface capabilities provided by personal computers (PC's) to more easily, efficiently and rapidly input the data needed to program PEDs and further provides a simplified means to load the PED programs into the PED. For purposes of this invention, the term "users" includes consumers, sellers, service, support or other individuals who use, sell or support PEDs and might have a need to or benefit from effecting the program of the PED. The term "PC" includes various hardware and operating system software combinations commonly available to users, including those utilizing operating systems such as the Microsoft Windows® operating system, the Macintosh® operating system, the Amiga operating system, the OS/2® operating system, and the various versions of the UNIX operating system.

Also, included as a type of PC are personal digital assistants (PDAs), such as the Apple Newton.

Figure 1:
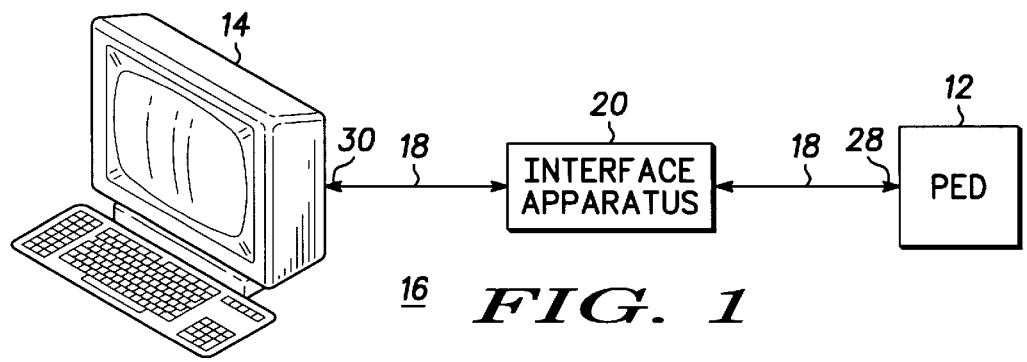
FIG. 1 is a detailed block diagram illustrating the components associated with the method and apparatus for programming a programmable electronic device in accordance with the present invention.
Figure 2:
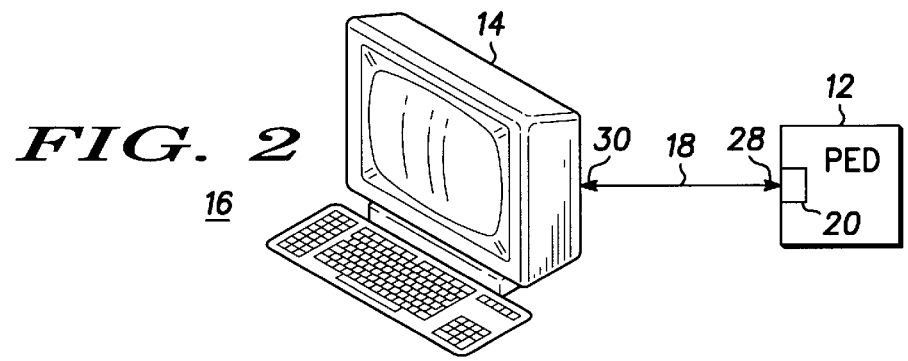
FIG. 2 is a detailed block diagram illustrating an alternate embodiment of the components associated with the method and apparatus for programming a programmable electronic device in accordance with the present invention.

Referring to FIG. 1, a detailed block diagram illustrating the primary components of the present invention is shown. The present invention includes a programmable electronic device (PED 12), a personal computer (PC) including software for controlling the programming of the PED, and a means to interface PC 14 to PED 12. The means to interface the PC to the PED may include a link between PC 14 and PED 12, as denoted by reference number 18, and an interface apparatus, as denoted by reference number 20, for providing the required interface between the output port of the PC and the input of the PED. Alternately, interface apparatus 20 may be included within PED 12 as shown in FIG. 2 whereby components shown in FIG. 2 that are identical to components shown in FIG. 1 are identified by the same reference numbers.

Although the present invention is applicable to a wide range of PEDs, a preferred embodiment of the present invention utilizes two models of Motorola portable cellular telephones: (1) the Motorola MicroTAC® Elite cellular telephone; and, (2) the Motorola Startac® cellular telephone. Both of these cellular telephone models utilize substantially the same programming model and have substantially the same interfacing capabilities built therein. Further, both of these phones include a three wire bus connector for allowing an external device to communicate therewith. The three wire bus is present on most Motorola analog cellular phones. The primary function of the bus is to provide a communication path between the transceiver radio component and the handset (including the display and keypad). The transceiver acts as the master of the bus and controls the communications of the bus using three lines (hence its name, the three wire bus) to transmit and receive data and to simultaneously provide clock timing. The clock signal may be used by a handset device to time the return of data on the bus in accordance with the protocol, electrical and timing specifications of the three wire bus.

Likewise, although the present invention is applicable to a wide range of PC's, a preferred embodiment of the present invention utilizes an Apple Macintosh computer or a Microsoft Windows based computer. These are the two most commonly used and commonly available PC's whereby these classes of PC's are available in a wide range of models including desktop and portable models, virtually all of which include the necessary operating system, processor, memory, display, keyboard and I/O ports necessary for the purposes of the present invention.

Figure 3:
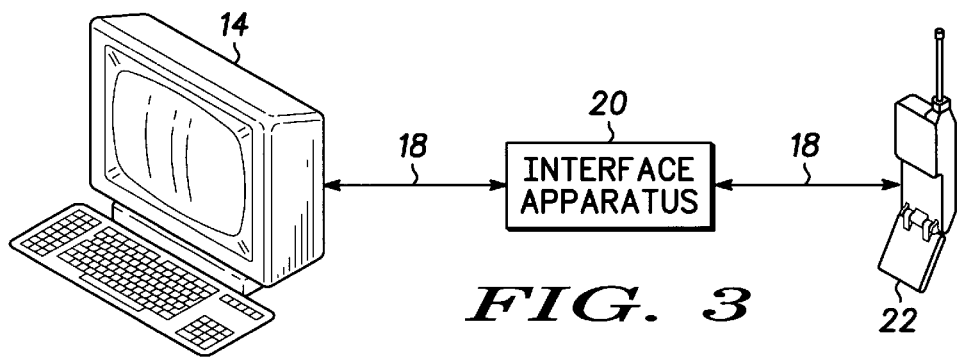
FIG. 3 is a detailed block diagram illustrating a method and apparatus for using a personal computer to program a cellular telephone.

Referring to FIG. 3, a detailed block diagram illustrating a method and apparatus for using a personal computer to program cellular telephone 22 is shown. It is understood that components shown in FIG. 3 that are identical to components shown in FIG. 1 are identified by the same reference numbers. Briefly, an output port of PC 14 is coupled to the three wire bus of cellular telephone 22 via link 18 and interface apparatus 20 thereby providing a means for PC 14 to effectively communicate with and program cellular telephone 22.

Interface apparatus 20 provides for proper signal conditioning and/or handshaking of signals transferred between PC 14 and cellular telephone 22. Such an interface may be required if the signal type and signal level outputted from PC 14 is different from that recognized or required by the three wire bus of cellular telephone 22 such as is the case between the industry standard RS232 serial bus found on almost all PC's and the three wire bus found on most Motorola cellular telephones. Interface apparatus 20 may take the form of at least two different embodiments. The first embodiment, which may be referred to as a P box interface apparatus (P box), couples between a parallel input/output (I/O) port of PC 14 and the three-wire bus associated with cellular telephone 22. However, a disadvantage of the P box is that a parallel port is only typically found on Windows-based PC's. The second embodiment for interface apparatus 20, which may be referred to as an S box interface apparatus (S box), couples between a serial input/output (I/O) port of PC 14 and the three-wire bus associated with cellular telephone 22. A serial type I/O port, such as an RS-232 serial port, is compatible with both Macintosh and Windows PC's.

Figure 4:
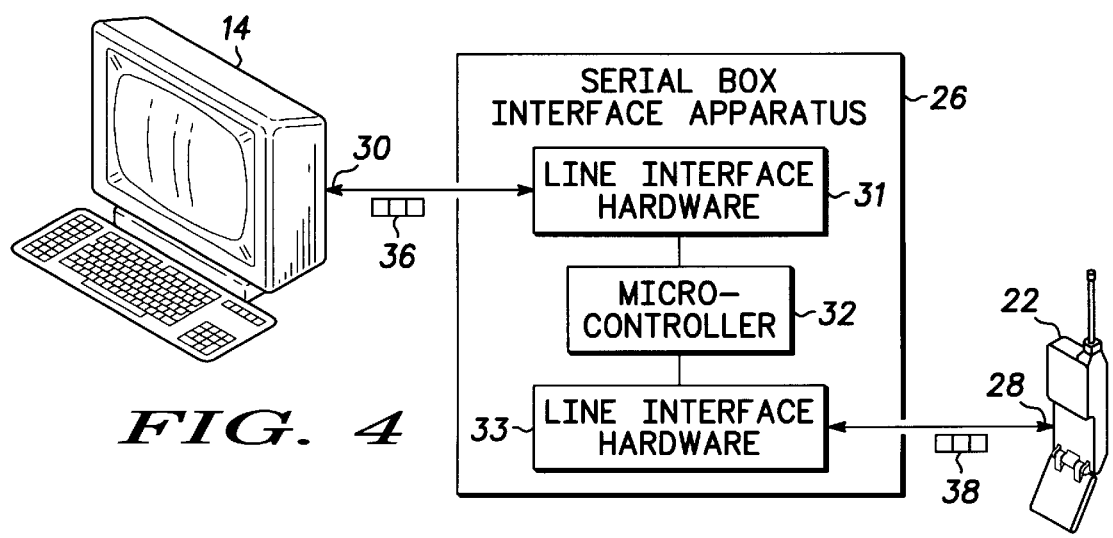
FIG. 4 is a detailed block diagram of a preferred embodiment of the interface apparatus of FIG. 3.

Referring to FIG. 4, a detailed block diagram of a preferred embodiment of interface apparatus S box 26 is shown. It is understood that components shown in FIG. 4 that are identical to components shown in FIG. 3 are identified by the same reference numbers. S box 26 is used to interface and couple serial output port 30 of PC 14 to the three wire bus port 28 of cellular telephone 22. For example, output port 30 of PC 14 may take the form of an RS-232 serial port which is standard equipment on virtually all PC's while the three wire bus 28 is present on all Motorola analog cellular telephones. S box 26 includes the necessary line interface hardware 31 and 33 as shown for providing line level translations (voltage and current) as necessary as well as implementing any logic functions required to interact with microcontroller 32. Given the physical (e.g., electrical end timing) characteristics defined by the respective bus specifications, it is then possible to use a predetermined message format to transfer information between PC 14 and S box 26.

To that end, S box 26 also includes microcontroller 32, along with any required external control or memory hardware such as oscillators/clocks to drive the chip and RAM/ROM for firmware operation (not shown). Microcontroller 32 serves as a translator between the RS-232 serial bus data and the three wire bus data to allow for effective communication between the PC and the phone. Microcontroller 32 receives data from PC 14 in the form of RS232 bus packets via line interface hardware 31. This data may be a predetermined request for either a command to cellular telephone 22 or a request for data from cellular telephone 22. Microcontroller 32 converts such command or request into the appropriate three wire bus data protocol message format 38 which is synchronized in time as necessary to communicate with cellular telephone 22. Interface logic hardware 33 insures that proper voltage and current levels are maintained on three wire bus 28.

As an example of the PC to cellular telephone link, consider the case where PC 14 is to generate a sequence of keypress commands for transmission onto the three wire bus to execute a desired telephone programming sequence. To begin, PC 14 generates a serial bus message packet, as denoted by reference number 36, that includes the desired key sequence data and necessary instructions. The serial data packet is then transmitted to S box 26 via the RS-232 bus. The microcode included within microcontroller 32 receives the serial bus packet, decodes the data and recognizes it as a sequence of keypresses to be generated onto the three wire bus. The microcode then formats the three wire bus messages, as denoted by reference number 38, and transmits such data onto the three wire bus to cellular telephone 22. The telephone recognizes the three wire bus data as keypress messages and responds accordingly. For example, if such data represented keypresses to increase the ring volume of the telephone, then the ring volume would be increased accordingly.

In a similar manner, consider the telephone to PC link. Initially, some relevant data regarding the state of the telephone is generated onto the three wire bus by the telephone. Microcontroller 32 monitors the three wire bus and recognizes that such data has been transmitted. Microcontroller 32 can then format such data into an appropriate RS-232 serial packet for transmission to PC 14. The PC 14 receives the incoming data, decodes the message, recognizes the data as relevant three wire bus data regarding the state of the telephone, and responds accordingly. For example, the phone may be displaying a phone number stored in its internal memory. The data intended for display is transmitted from memory to the display via the three wire bus while the S box is monitoring the three wire bus and sends this data to the PC via its serial port. The PC and its associated software (to be described hereinafter) decodes the incoming phone number data and utilizes or stores the data as needed. This is the process, for example, that occurs when the PC is reading the directory contents of the memory of the cellular telephone.

In this manner, S box 26 allows PC 14 and cellular telephone 22 to effectively communicate. It is understood that the nature of S box 26 is provided as a preferred embodiment only and that a plurality of interface arrangements may be readily available as will be apparent to those skilled in the art or described herein.

A wide variety of links for link 18 may be utilized. For any given link technology, the interface apparatus 20 will interface an output port on the computing device 14 to an input port present on the PED. For example, link 18 may take the form of (i) a cable/wire, (ii) an infra-red link, (iii) an RF link, (iv) an optical link, (v) an audio link, or (vi) a human link. In the case of a cable/wire, an actual cable exists between PC 14 and cellular telephone 22 such as an actual cable between the RS-232 port of PC 14 to interface 20 and to interface 20 to the three wire bus port of cellular telephone 22.

An infrared link requires that infrared transceivers be included both on PC 14 and cellular telephone 22 whereby PC 14 communicates with cellular telephone 22 via infrared signals that are transmitted and received between PC 14 and cellular telephone 22. Likewise, an optical link is similar to an infrared link whereby both the phone and the PC would include optical transceivers for transmission of data. Both the infrared and optical links (and to a lesser extent all of the links) may be included as an internal component of PC 14 or PED 12. For example, the Apple Newton PDA-type PC and most VCR (video cassette recorders) PED's include attached infrared transmitters and/or receivers. Additionally, the link components such as components with reference numbers 30, 31, 33 and 28, may be externally attached to the PC or PED. For example, an infrared transmitter may be connected to interface hardware 33 to allow the PC to control a common VCR. Also, the PC may have the link components internal or external and the PED may be the same or opposite.

An RF link involves the use of a modem within PC 14 that calls cellular telephone 22 (or vice versa) and an exchange of data between the PC and the telephone occurs via direct modem data or dual tone multi-frequency (DTMF) signals.

An audio link involves the generation and recognition of DTMF signals between PC 14 and cellular telephone 22 and would utilize a DTMF decoder within cellular telephone 22.

Any one of the above links may be uni-directional or bi-directional. A bi-directional link allows data to be sent to and received from the PED. A uni-directional link, however, would only allow data (i.e., commands) to be sent to the PED from the PC. For example, a handheld remote control sends commands to a TV or VCR uni-directionally. In the case of a uni-directional link between PC 14 and cellular telephone 22, the PC could program the phone with a predetermined program, but the current status or program of the phone could not be ascertained via such uni-directional link.

Finally, a human link involves PC 14 displaying or printing out a sequence of steps instructing a user the exact key depresses on PED 12 to perform a specified programming function. This would at least abate the need for the user to search through large instruction manuals when the user desires to program a simple feature within the PED.

As described herein, cellular telephone 22 is programmed by having PC 14 emulate, onto the three wire bus, the keypresses associated with the cellular telephone 22 and monitor the cellular telephone 22 display data appearing on the three wire bus so that such data can be sent to cellular telephone 22 for programming it as if the user were actually pressing those keys and reading the display. However, in an alternate embodiment, PC 14 may have direct access within the memory of cellular telephone 22 to directly read/write to such memory and to have access to various configuration settings within cellular telephone 22. Such an alternate programming method would more rapidly program the cellular telephone since no key depress commands would have to be recognized.

The method of programming the cellular telephone is implemented on the computing device with a software application. The software application has the ability to transmit data to the cellular telephone via link 18 and interface apparatus 20, and receive data from the cellular telephone via the same channels. The software incorporated in PC 14 includes several key features. First, the software has appropriate data entry fields and instructions to gather data and guide the user through the programmable features of a particular cellular telephone. For example, the software prompts the user to enter a list of phone numbers and associated names to be stored in the internal memory of the phone. The software can then subsequently program the information into the cellular telephone. Further, a number of additional features that are commonly found on cellular telephones, including volume controls, ring controls, timer controls, service options, etc., may also be programmed in a similar manner.

Second, the software can also interrogate the cellular telephone to determine the current state of all programmable features given the use of a bidirectional link. In addition, the software has the ability to store and read individual configurations to and from external files on the PC. By combining these features, a powerful and flexible program environment may be created with a much simpler user interface. Applications of this program are numerous and include programming features on a particular cellular telephone, transferring configurations from one phone to another, maintaining multiple configurations, or even configuring a series of cellular telephones in an identical manner.

Third, the software also provides appropriate entry fields to automate the NAM programming sequence. This feature significantly reduces the burden on the cellular telephone sales personnel and service providers while reducing the errors associated with the NAM program.

Fourth, the software may also provide training procedures to familiarize the user on how to utilize the newly programmed features of a particular cellular telephone. For example, the steps required to recall a number and place a call may be demonstrated.

Figure 5:
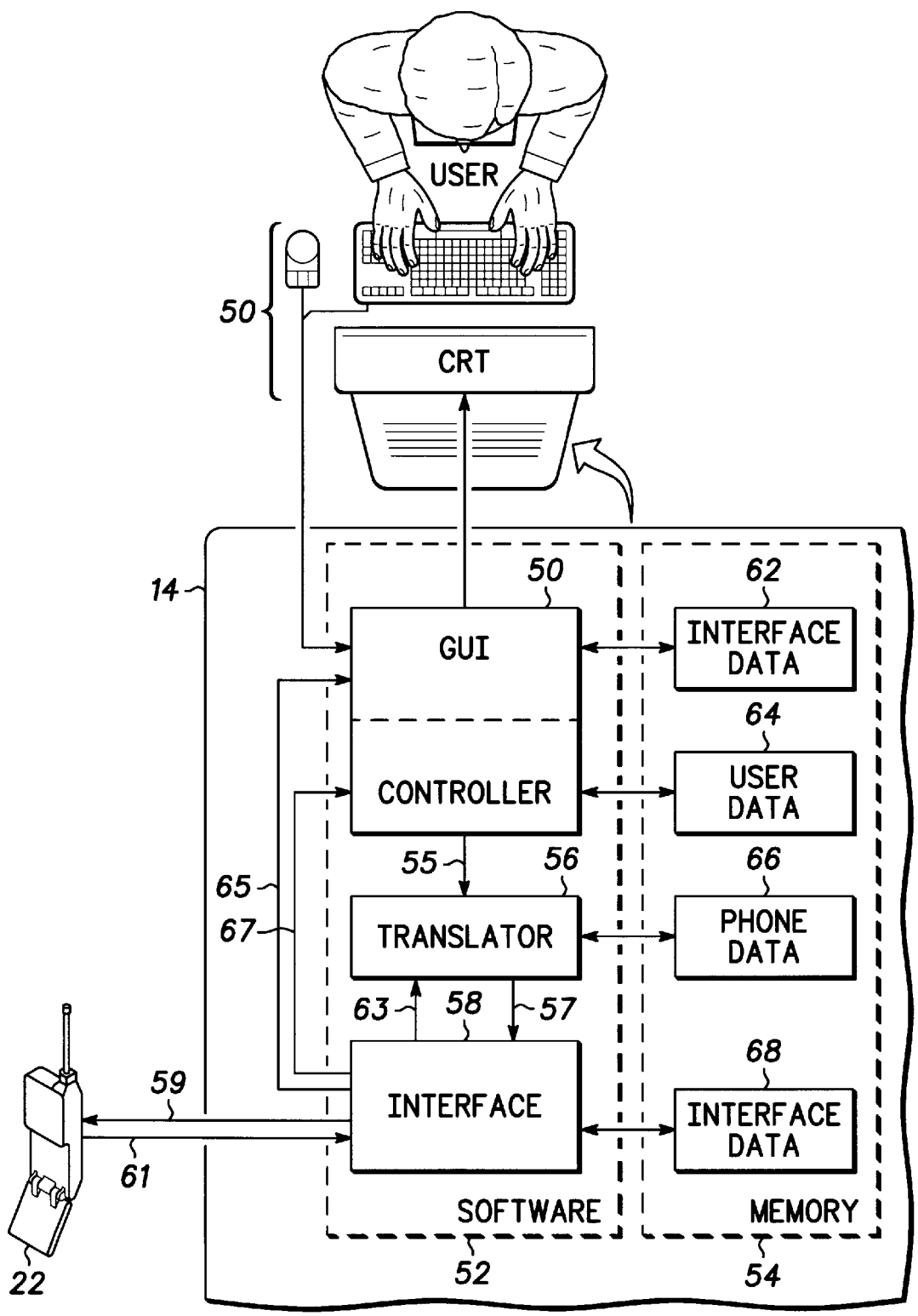
FIG. 5 is a block diagram illustrating the major software components in accordance with the preferred embodiment of the present invention.

Referring to FIG. 5, a block diagram illustrating a portion of PC 14 including the software components within PC 14 for use in programming cellular telephone 22. Software application block 52 includes graphical user interface (GUI)/controller 54, translator 56 and interface 58. The software components of FIG. 5 further include memory database block 54 including GUI data 62, user data 64, phone data 66 and interface data 68. Additionally, PC 14 includes user input/output (I/O) interface 50 which may include, for example, a display and a keyboard and mouse, for allowing a user to interface with the software components.

The GUI portion of GUI/controller 54 interfaces and communications with the user via user I/O interface 50 for allowing a user to interface with the software components and for allowing the user to easily select, activate or modify the various programmable features of cellular telephone 22. The GUI portion also communicates with interface 58. The GUI is responsible for (i) organizing the data on the display for the user, (ii) verifying the data entry such that, for example, a phone number is really a phone number and does not have letters entered within it, and (iii) may additionally provide help menus for aiding the user in accomplishing desired programming tasks. GUI database 62 provides data for use by the GUI that is specific for features corresponding to a plurality of cellular telephone models to be programmed thereby informing the GUI of specific phone features for the phone to be programmed.

User database 64 includes various data selected by the user based upon the user's selection of various features to be programmed such as the user's selection of tone controls and the user's pre-entered phone numbers.

The controller portion of GUI/controller 54 manages the user's programmable electronic device (PED) program and insures compatibility between the PED, i.e., cellular telephone 22, and the link type. User database 64 provides data to the controller including phonebook data and various settings associated with programming the PED. The controller portion of GUI/controller 54 provides various feature settings, as represented by reference number 55, to translator 56 based upon the features selected by the user via the GUI portion of GUI/controller 54.

Translator 56 receives the feature settings from the controller portion of GUI/controller 54 and translates those settings into keypress sequences that are specific to the cellular telephone to be programmed and supplies this data to interface 58, via line 57. For example, when it is desired to program an additional name and number into a phonebook of a cellular phone, the translator would generate the specific keypress sequences that would be required to be executed on cellular telephone 22 in order to program such name and number into the phone's memory. Also, embedded within translator 56 are directions for what needs to be on the display of cellular telephone 22 during various points of the keypress sequences. This allows various features of cellular telephone 22 to be programmed even though it is required to have knowledge of what information is being displayed on cellular telephone 22 during the programming process such as, for example, turning on or off the ringer of cellular telephone 22. This process will be discussed in more detail hereinafter with reference to the tone controls. In essence, this feedback between what is on the display of cellular telephone 22 and translator 56 allows the necessary feedback from cellular telephone 22 to determine what state the cellular telephone is currently in so that the proper programming state may be set. Phone database 66 includes data that is specific to programming protocols for a plurality of cellular telephones to be programmed. For every feature that can be programmed into, or requested from the phone 22, the phone database 66 knows the feature setting format sent from the controller 54 and the corresponding keypress sequences 57 and required phone display feedback values 61 necessary to complete the command or request.

Interface 58 is coupled to translator 56 for receiving the keypress sequences and for formatting such keypress sequences and providing these coded keypress commands to cellular telephone 22, via line 59. Interface 58 also receives data from cellular telephone 22, via line 61, that is comprised of phone display feedback and provides such data back to translator 56, via line 63, to provide for phone feedback of the programming process, as alluded to above. Interface 58 also provides programming instructions to be displayed on the PC to the GUI portion of GUI/controller 54, via line 65, for subsequent display to the user via I/O interface 50. This provides a means for providing manual instructions, if desired, to the user thereby enabling the user to program cellular telephone 22 without having to refer to lengthy owner's/instruction manuals. Interface 58 also provides phone feedback of current feature settings of cellular telephone 22 to the controller portion of GUI/controller 54, via line 67, for ascertaining the current settings of cellular telephone 22.

Interface database 68 provides data to interface 58 for providing data that is specific to a plurality of link protocols that may exist between PC 14 and cellular telephone 22, as described above. Each keypress within a keypress sequence appearing on line 57 corresponds to a button press on the phone 22. Interface 58 must convert each keypress from translator 56 into a stream of formatted bits to be sent over the line 59. The formatted bits form message packets which may include, depending on the specific interface 58, message headers, message word counts, message type identifiers, data values, parity or checksum type values, etc. Also, requests for data from the phone 22 from translator 56 must also be converted into message packets of formatted bits. Similarly, phone display feedback line 61 provides formatted message packets to interface 58 which must be converted into the display character data. Additionally, in the case of providing manual instruction to the user and bypassing line 59, the interface 58 converts the keypress sequences and display requests not into formatted message packets, but rather into commands and requests formatted in ASCII messages which can be read by the user when displayed via user I/O 50. All of the formatted message packets and ASCII conversions formats are maintained in the interface database 68.

It is worth noting that interface 58 is shown in FIG. 5 as being connected directly to cellular telephone 22. However, it is understood that such coupling between interface 58 and phone 22 further includes components 30, 26 and 28 as shown in FIG. 4. In essence, FIG. 5 illustrates the software interface and for simplicity does not illustrate any hardware interfaces which are shown in FIG. 4.

Figure 6:
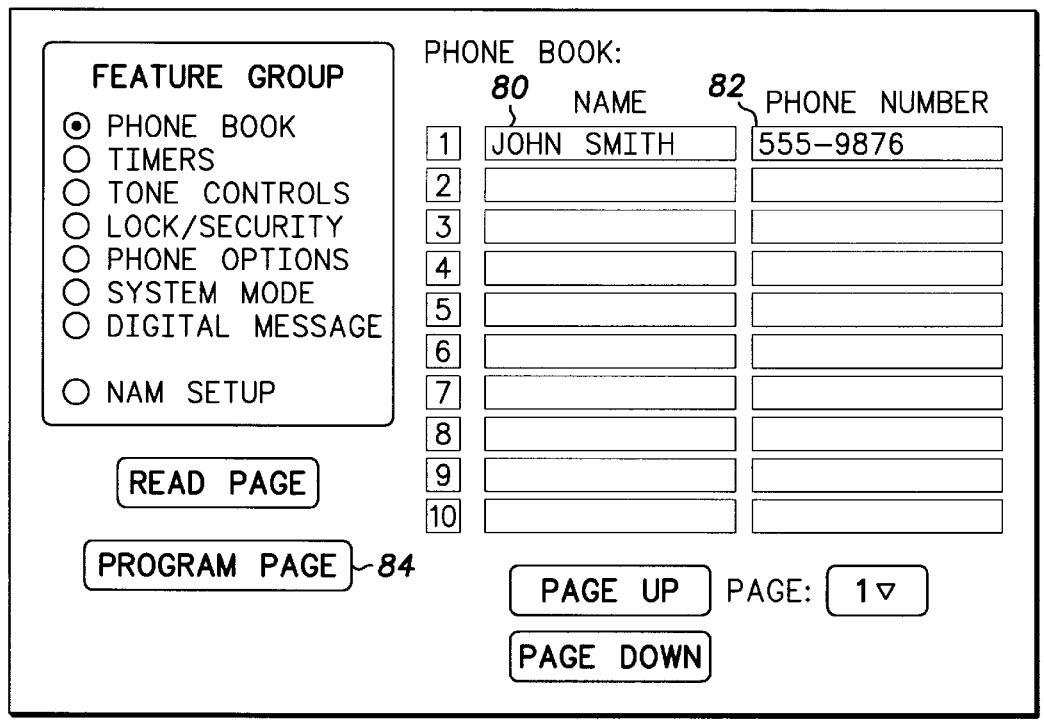
FIG. 6 is a GUI screen view of the phone book features in accordance with the preferred embodiment of the present invention.

Referring to FIG. 6, an exemplary screen shot of a graphical interface for programming phonebook data in cellular telephone 22 is shown. If a name and number is desired to be added to the phonebook of cellular telephone 22, the user simply enters the name of the person, as shown in block 80, and the corresponding telephone number, as shown in block 82. In order to program the cellular telephone 22 with such entered name and number, the user simply clicks on Program Page block 84 and the phone is programmed via a process that will be described in more detail hereinafter.

Figure 7:
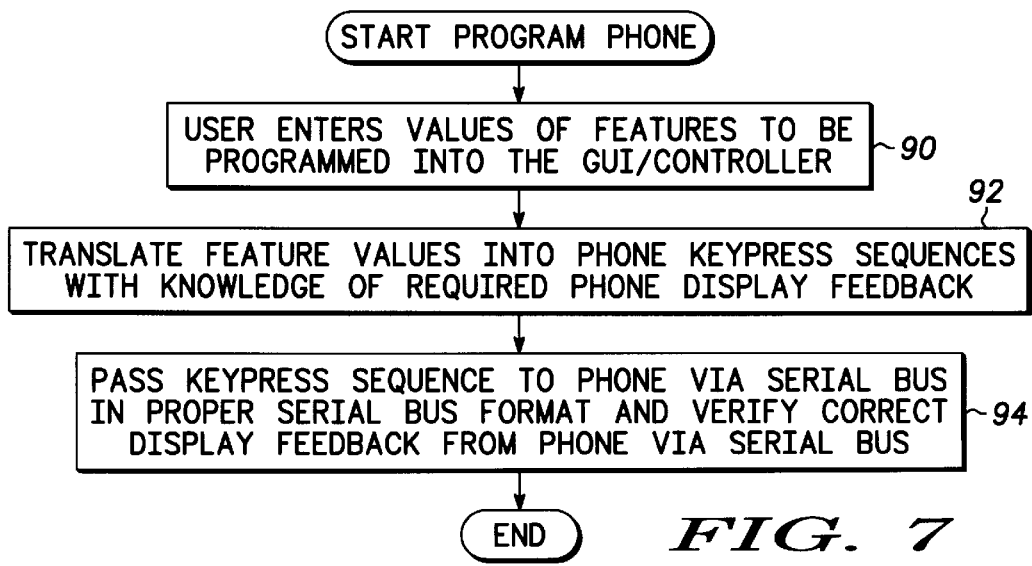
FIG. 7 is a simplified flow chart showing the major steps to program a phone in accordance with the preferred embodiment of the present invention.

Referring to FIG. 7 a simplified flow chart is illustrated for programming cellular telephone 22. Briefly, desired programming features/settings are selected by the user via the GUI and such features are translated into corresponding key depresses that cellular telephone 22 recognizes such that cellular telephone 22 may be programmed with such features and settings.

Upon starting, the user enters values of features to be programmed into GUI/controller 54 (FIG. 5), via the GUI portion, as represented by box 90. For example, as shown in FIG. 6, the user enters various names and telephone numbers when the features "Phone Book" is selected.

Next, the feature values are translated into phone keypress sequences, via translator 56 (of FIG. 5), with knowledge of required phone display feedback, as represented by block 92. As aforementioned, this knowledge may be required when it is necessary to ascertain what is being displayed on cellular telephone 22 during the programming process.

Finally, the keypress sequences are passed to the cellular telephone 22 via the serial bus in proper serial bus format, via interface 58 (of FIG. 5), and the correct display feedback from cellular telephone 22 is verified via the serial bus from the phone display feedback data being transmitted from cellular telephone 22 to interface 58, as represented by block 94.

Figure 8:
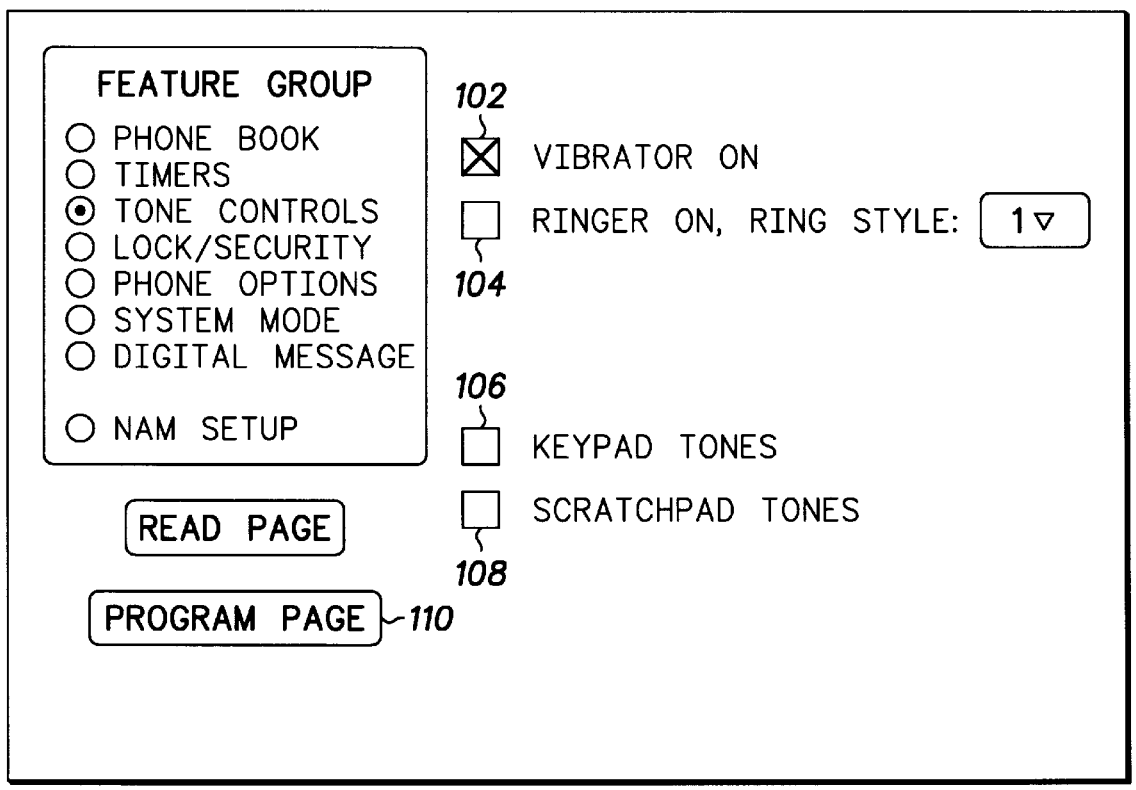
FIG. 8 is a GUI screen view of the tone control features in accordance with the preferred embodiment of the present invention.

Referring to FIG. 8, an exemplary screen shot of the GUI for adjusting the tone controls is shown. The user simply selects whether it is desired to have the vibrator on and/or the ringer on by appropriately checking boxes 102 and 104, respectively. Further, other functions may be selected such as whether keypad or scratch pad tones are activated by selecting boxes 106 and 108, respectively. Once the proper selections are made, the user clicks on box 110 and the process of programming the vibrator and ringer features of cellular telephone 22 is initiated. Programming the vibrator/ringer on or off is an example where it is imperative that the software have knowledge of current phone display feedback since Motorola's Startac and Elite models of cellular telephone 22 include menus which must be scrolled through in order to appropriately select the vibrator on and/or the ringer on.

Figure 9:
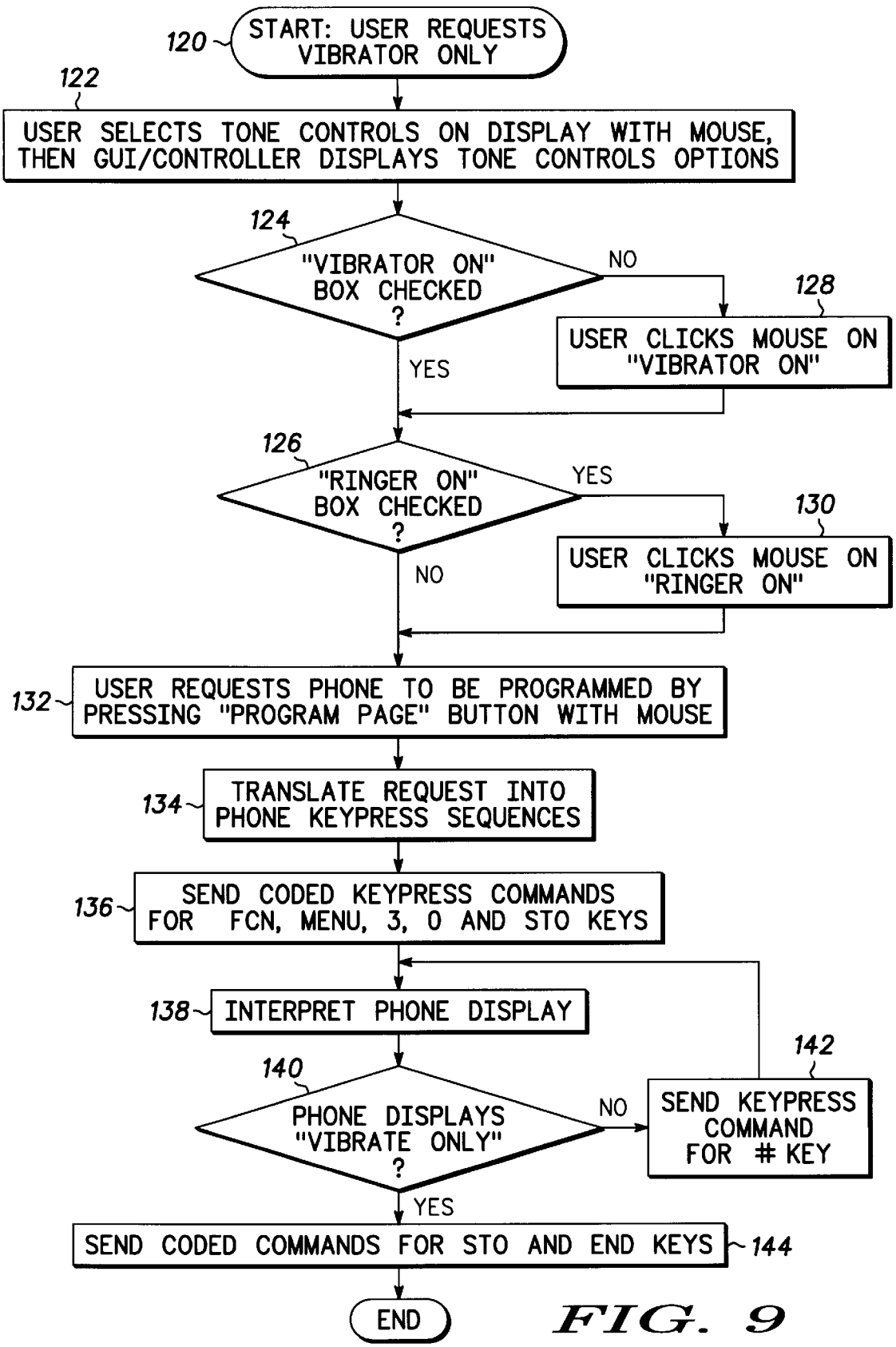
FIG. 9 is a flow chart showing the steps necessary to program the vibrator and ringer features as depicted in the GUI view of FIG. 8 with the phone interface link shown in FIG. 3.

To that end, the reader is referred to FIG. 9 which illustrates a detailed flow chart of a representative programming process for setting the vibrator and/or the ringer on. Upon starting, assume, for example, that the user requests that the vibrator be turned on and that the ringer be turned off, as represented by circle 120. Accordingly, the user selects the tone control feature group on the GUI with the mouse and the GUI/controller 54 displays a tone control menu, similar to one shown in FIG. 8, as represented by box 122. The current settings within the tone control menu are those that are current in user database 64.

Accordingly, the user clicks the mouse appropriately on boxes 102 and 104 to insure that the vibrator is checked on and the ringer is checked off, as represented by diamonds 124 and 126 and boxes 128 and 130.

The user then request the phone to be programmed by clicking on the Program Page block 110, as represented by box 132.

Figure 10:
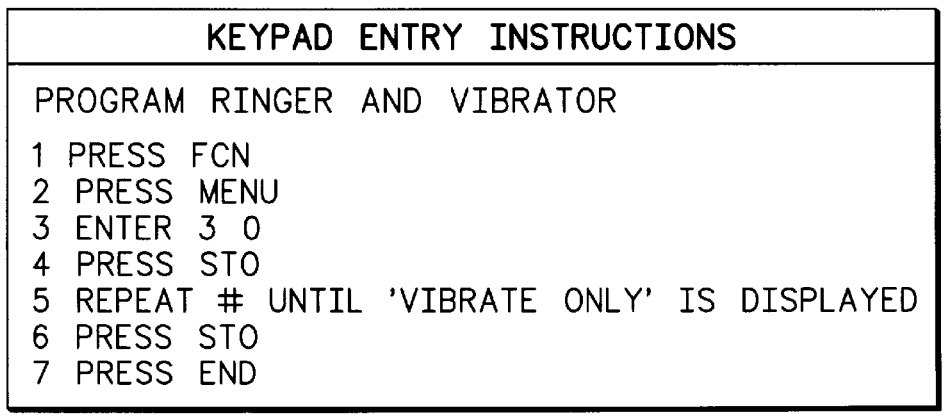
FIG. 10 is a GUI screen view of the output to program the vibrator and ringer features as depicted in GUI view of FIG. 8 using the display output instead of the phone interface link.

This appropriate feature setting data is sent to translator 56 whereby the feature settings are translated into phone keypress sequences via translator 56, as represented by box 134. Referring to FIG. 10, the specific keypress sequences for programming the ringer and vibrator are listed. However, note that step 5 requires depressing the "#" key until "Vibrate Only" is displayed on cellular telephone 22. Therefore, such a programming sequence requires that the display of the telephone be monitored for such data as will now be described.

First, interface 58 sends the coded keypress commands corresponding to the four steps in programming the ringer and vibrator (i.e., keypresses FCN, MENU, 3, 0, and STO) to cellular telephone 22 via line 59 (of FIG. 5), as represented by box 136.

The software then monitors and interprets the phone display data via the phone display feedback line 61 (of FIG. 5) from cellular telephone 22 to interface 58, as represented by box 138.

Next, the software determines whether the phone displays "Vibrate Only", as represented by diamond 140. If it is not displayed, then interface 58 sends the keypress command for the "#" keypress to cellular telephone 22 via line 59, as represented by box 142 and again the software interprets the phone display data, as represented in box 138.

However, once the phone displays "Vibrate Only", translator 56 generates the final two required key depresses of STO and END and interface 50 sends such coded commands for STO and END to cellular telephone 22 and the programming of turning the vibrator on and the ringer off is accomplished.

The software application associated with the cellular telephone programmer taught herein may be provided via articles of manufacture which are manufactured to include the software components 50–68 (of FIG. 5) whereby these software components include a plurality of binary values that are typically loaded into memory (not shown) of PC 14 from a computer readable media such as electrically erasable programmable read-only memory (EEPROM), read-only memory (ROM), dynamic random access memory (DRAM), static random access memory (SRAM), magnetic storage, tape storage, optical storage, compact discs (CDs), flash memory storage, network storage, another computer across a communications link, or like storage device for computer executable code, or computer data.

By now it should be apparent from the foregoing discussion that the present inventions describes a novel and unique method and apparatus for accomplishing the programming of a PED, such as a cellular telephone, via the use of a personal computer (PC). The present invention includes software, which may be accessed via a computer readable storage media and then transferred to memory within the PC, for providing a graphical user interface (GUI) to the user for ease and simplicity of selecting various programming features and settings associated with the cellular telephone to be programmed. The software further includes a translator for translating these user selected features/settings into specific key depresses to be sent to the cellular telephone, via software and hardware interfaces, for accomplishing the programming of such features/settings. Additionally, the software includes the capability to monitor the data being displayed on the cellular telephone because such data may be required to accomplish various programming features.

While the invention has been described in specific embodiments thereof, it is evident that many alternations, modification and improvements may be apparent to those of ordinary skill in the art. Accordingly, it is intended that all such alternations, modifications, and variations fall within the broad scope of the appended claims.

What is claimed is:

1. A cellular telephone programmer for simplifying the programming of a cellular telephone, the cellular telephone having a plurality of programmable features, the cellular telephone programmer comprising:

a first plurality of binary values for generating a graphical user interface (GUI) for allowing a user to easily select at least one programmable feature of the plurality of programmable features associated with the cellular telephone and to specify a setting for said at least one programmable feature;

a second plurality of binary values for generating at least one feature setting signal corresponding to said selected setting; and a third plurality of binary values for converting said at least one feature setting signal into commands that are recognizable by the cellular telephone for use in programming the cellular phone;

wherein said first plurality, said second plurality, and said third plurality of binary values are stored on at least one storage medium.

2. The cellular telephone programmer according to claim 1 wherein said third plurality of binary values includes:

a fourth plurality of binary values for translating said at least one feature setting signal into keypress sequences that are specific to the cellular telephone to be programmed; and a fifth plurality of binary values for formatting said keypress sequences into keypress commands that are recognizable by the cellular telephone.

3. The cellular telephone programmer according to claim 1 further including:

a fourth plurality of binary values for receiving display commands from the cellular telephone during programming for monitoring data appearing on a display of the cellular telephone; and a fifth plurality of binary values for interpreting said monitored data for use in programming certain features of the cellular telephone.

4. The cellular telephone programmer according to claim 1 wherein said third plurality of binary values includes a fourth plurality of binary values for converting said at least one feature setting signal to a format supported by a keypress command bus internal to the cellular telephone to be programmed, wherein said keypress command bus provides a communication link between a keypad and a controller within the cellular telephone to be programmed.

5. The cellular telephone programmer according to claim 4 wherein said fourth plurality of binary values includes a fifth plurality of binary values for converting said at least one feature setting signal to a format that emulates signals created when keys on a keypad of the cellular telephone to be programmed are pressed.

6. The cellular telephone programmer according to claim 1 further including a fourth plurality of binary values for storing data specific to features of a plurality of cellular telephone models to be programmed.

7. The cellular telephone programmer according to claim 1 further including a fourth plurality of binary values for storing data specific to features of the cellular telephone that are selected by the user.

8. The cellular telephone programmer according to claim 1 further including a fourth plurality of binary values for storing data specific to programming protocols of a plurality of cellular telephones.

* * * * *